May 9, 1939.　　　L. F. WOODRUFF　　　2,157,584
RADIO STATION RECORDER
Filed Nov. 7, 1936
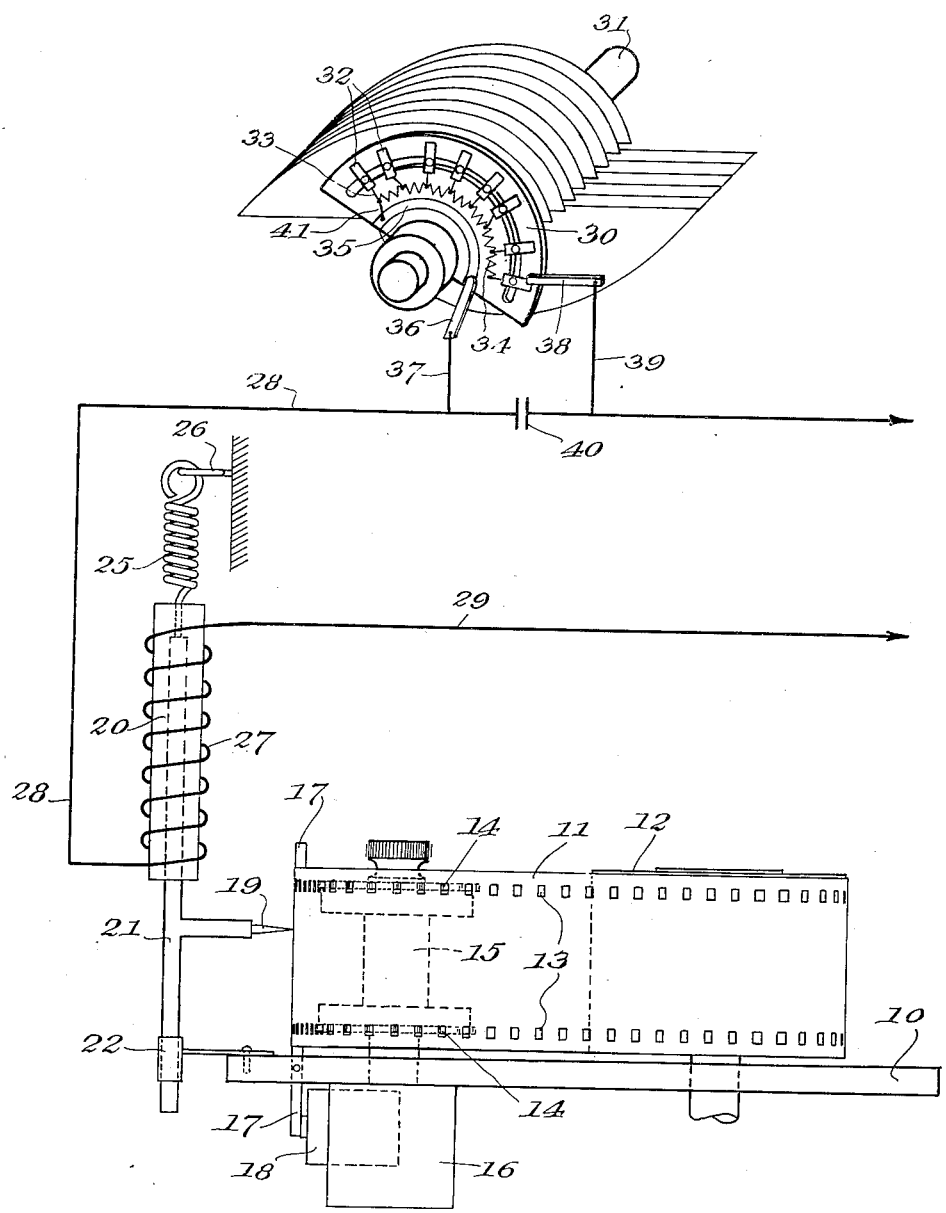
INVENTOR.
Louis F. Woodruff
BY Pike, Colver and Gray
ATTORNEYS.

Patented May 9, 1939

2,157,584

UNITED STATES PATENT OFFICE 2,157,584

RADIO STATION RECORDER

Louis F. Woodruff, Wellesley, Mass.

Application November 7, 1936, Serial No. 109,724

2 Claims. (Cl. 234—69)

In recent years manufacturers and merchants have utilized the radio for advertising purposes to such a great extent by sponsoring entertaining programs of various types that it has become desirable to determine the types of programs which most appeal to the various classes and types of radio listeners. To accomplish this it has been proposed to build into each radio receiving instrument a recorder which will produce a cord of the various broadcasting stations to which the radio receiving instrument has been tuned and the time at which each station was tuned in. This, however, is not entirely satisfactory because it requires special design of the receiving instrument and is too expensive.

It is an object of the present invention to provide an accurate recorder which can be temporarily connected to any radio receiving instrument at any desired time and for any desired period of time thereby making possible the determination of the listening habits of any particular class of listeners with a relatively small number of recorders.

The recorder of the invention may comprise mechanism for moving a record sheet at a desired rate together with means which is adapted to make visible indications at predetermined positions upon the record sheet, the predetermined positions corresponding to predetermined broadcasting stations. This structure may be positioned within or outside, at a desired place near or remote from, the radio receiving instrument. In accordance with the invention electrically actuated mechanism for making the visible indications is associated with such structure and is controlled through remotely positioned means by changes in the setting of the tuning mechanism of the receiving instrument.

Before explaining in detail the present invention it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not of limitation, and it is not intended to limit the invention claimed herein beyond the requirements of the prior art.

The invention will be more clearly understood from the following description in conjunction with the single figure in the accompanying drawing which is a diagrammatic view of a device embodying the invention.

As illustrated in the accompanying drawing a device embodying the invention may comprise a support 10 adapted to carry a supply roll of record tape 11 (not shown) and also rotatably support a record tape takeup roll 12. The record tape 11 is provided with a series of perforations 13 adjacent each longitudinal edge which are adapted to be engaged by the teeth 14 of sprockets which are fixed upon a shaft 15 rotatably carried by the support 10. The sprockets 14 and takeup roll 12 are driven to feed the record tape 11 at a predetermined desired rate by a suitable motor, such as a clock motor 16, through suitable driving connections (not shown). The record tape 11 is fed over a table 17 which, as illustrated, is pivotally carried by the support 10 and is adapted to be moved by an electro-magnet 18 to bring the record tape 11 into engagement with the stylus 19.

The structure above described may be mounted within a radio receiving instrument or outside the latter at any desired place. Associated with this structure is a solenoid 20 having a plunger 21 which carries the stylus 19. The plunger 21 is provided with a squared end portion which is slidably guided in a guide sleeve 22 carried by the support 10. A spring 25 connected at one end to the solenoid plunger 21 and connected at its other end to a stationary support 26 tends to resist movement of the plunger 21 and the stylus 19 in response to energization of the solenoid 20. The solenoid winding 27 is connected by leads 28 and 29 to a suitable source of electrical energy (not shown).

A disk 30 of any suitable electrical insulating material, such as Bakelite, is adapted to be fixed upon a condenser shaft 31 of the tuning mechanism of any standard radio receiving instrument. Electrical contacts 32 are adjustably carried upon the disk 30 in any predetermined spaced relation. The disk 30 is provided with a slip ring 35 adapted to be engaged by a brush 36 which is connected by a lead 37 with the conductor 28. A brush 38 is mounted adjacent the disk 30 so as to engage successively the contacts 32 as the shaft 31 is rotated. The brush 38 is connected by a lead 39 to the conductor 28. A condenser 40 is interposed between the brushes 36 and 38. Flexible leads 33 connect adjacent contacts 32 with the resistance 34 at spaced points on the latter and, preferably, so as to impose substantially equal portions of the resistance between the various contacts 32. The end of the resistance 34 remote from the brush 38 is connected by a lead 41 with the slip ring 35.

The contacts 32 are positioned upon the disk 30 so as to be brought into engagement with the brush 38 when the radio receiving instrument is tuned to different predetermined broadcasting stations.

In the operation of the device, the record tape or sheet 11 is moved continuously at a desired rate and the arrangement is such that the platform 17 is moved to bring the tape 11 in contact with the stylus 19 when the main switch of the radio receiving set is turned on. Assuming that the radio receiving set is tuned so as to bring the contact 32 in engagement with the brush 38 as indicated in the drawing, electrical energy will be supplied to the solenoid 20 through the brush 38, contact 32, the entire resistance 34, the lead 41 and slip ring 35 to the brush 36 and thence through the solenoid winding 27. This causes the solenoid 20 to be energized to move the solenoid plunger 21 and the stylus 19 a predetermined amount with respect to the record sheet 11 against the action of the spring 25. If the setting of the tuning mechanism of the radio receiving instrument is changed so as to bring a different contact 32 in engagement with the brush 38, a portion of the resistance 34 will be cut out of the circuit, and, consequently, a greater amount of electrical energy will be supplied to the solenoid 20 and move the stylus 19 a greater amount with respect to the record sheet 11. In other words, as the setting of the tuning mechanism of the radio receiving instrument is changed to bring the successive contacts 32 successively in engagement with the brush 38, the stylus 19 will be moved successively to predetermined positions with respect to the record sheet 11, each position corresponding to a different predetermined radio broadcasting station. Consequently, since the record sheet 11 is moved at a predetermined rate and since the time at which its movement was started can be known, it is possible to determine from an examination of the record sheet when the radio receiving instrument was tuned to any one of the broadcasting stations. By connecting the contacts 32 with the resistance 34 so that substantially equal portions of the resistance 34 is interposed between adjacent contacts, the markings upon the record sheet representing the broadcasting stations corresponding to the positions of the various contacts 32 are spaced substantially equidistant.

In this manner the indications or lines are always at the same transverse positions on the sheet and in a direction transversely of the direction of movement of the sheet regardless of the adjusted positions of the contacts and the distance between the lines for any two successive contact means will be substantially constant. As a result, there can be no overlapping of the lines or superimposing of the same nor will the lines be so closely spaced together as to render the record illegible. Thus, with any number of stations, and notwithstanding their close frequencies, the indicating lines will be readily understood.

I claim:

1. A recording device including a longitudinally movable sheet and electrically operated means for making line indications thereon transversely spaced with respect to the direction of movement of the sheet, said means including a plurality of electrical circuits having adjustable contact means, means for closing each circuit through said contact means and means for assuring that the said lines will always be at the same transverse positions on the sheet and in a direction transversely of the direction of movement of the sheet for the circuit including the same contact means regardless of the adjusted positions of the contact means and that the distance between the lines for any two successive contact means will be substantially constant.

2. In a recording device, a recording instrument comprising a longitudinally movable sheet, a marking means movable in a direction transversely of the direction of movement of the sheet, means for moving the marking means, a resistance element, a series of contacts each connected to the resistance element, the value of the resistance being the same between any two connections, means selectively connecting a contact with the means for moving the marking means, said contacts being adjustable to vary the distance therebetween, whereby the marking means will make a record on the sheet at the same transverse positions on the sheet transversely of the direction of movement of the sheet for the same contact irrespective of the adjustment of the contacts and so that the distance between any two successive marks will be substantially constant.

LOUIS F. WOODRUFF.